United States Patent
Van Zon

[15] 3,652,109
[45] Mar. 28, 1972

[54] TUBULAR CONNECTING PIECE FOR HELICALLY GROOVED TUBES

[72] Inventor: Cornelis Van Zon, Zwolle, Netherlands
[73] Assignee: Industriele Onderneming Wavin N.V., Zwolle, Netherlands
[22] Filed: Nov. 4, 1969
[21] Appl. No.: 873,816

[30] Foreign Application Priority Data

Nov. 8, 1968 Netherlands...........................6815986

[52] U.S. Cl............................................285/176, 285/390
[51] Int. Cl.......................................................F16l 55/00
[58] Field of Search.................285/355, 390, 156, 423, 175, 285/176, 177, 238, 328; 287/105, 117, 125, ; 279/99; 138/44, 89, 96, 109; 85/36

[56] References Cited

UNITED STATES PATENTS 2,121,937  6/1938  Tichota et al. ......................85/36 UX
2,326,261  8/1943  Shippee et al.......................85/36 UX
2,396,835  3/1946  Eggert .........................................85/36

FOREIGN PATENTS OR APPLICATIONS 521,613  3/1955  Italy......................................285/423

OTHER PUBLICATIONS

Primary Examiner—David J. Williamowsky
Assistant Examiner—Wayne L. Shedd
Attorney—Woodhams, Blanchard & Flynn

[57] ABSTRACT

The invention relates to a tubular connecting piece for grooved tubes whereby one or more ends of the piece are at least partially closed by two end planes making an angle with respect to one another. Each end plane covers at least a part of the half section of one end of the connecting piece. The end edges of the end planes are connected by planes extending parallel to the longitudinal direction of the part of the connecting piece comprising said end planes.

4 Claims, 4 Drawing Figures

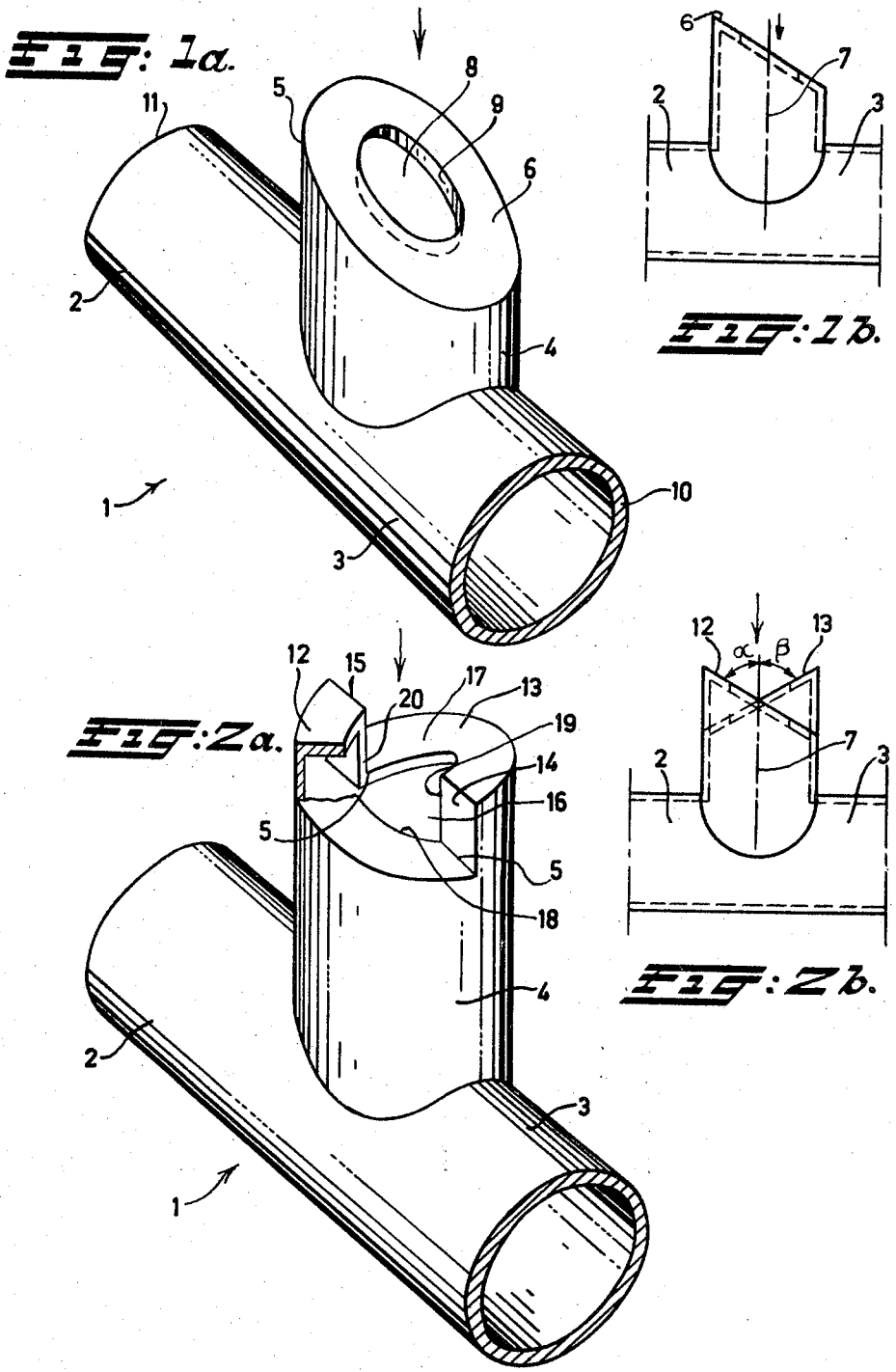

TUBULAR CONNECTING PIECE FOR HELICALLY GROOVED TUBES

The invention relates to a connecting piece for transversely more particularly helically grooved tubes, especially plastic tubes with helical grooves, in particular plastic drains of this type.

For connecting these known transversely helically grooved tubes connecting pieces are used which are likewise provided with transverse helical grooves. This involves that a large number of connecting pieces with different diameters are kept in store in dependence on the range of diameters of the transversely grooved tubes.

When these tubular connecting pieces are used for connecting the main pipe line with branch pipe lines of different diameters as often occurs in draining or irrigation pipe systems, difficulties are often encountered.

Moreover trouble is often encountered when such transversely grooved tubes, however provided with a smooth inner wall, should be interconnected.

It is an object of the invention to obviate these difficulties by providing a tubular connecting piece whereby this trouble is overcome.

This object is attained according to the invention in the way that at least one of the ends of the tubular connecting piece is at least partially closed by at least one end wall position which makes an angle with respect to the axis of the tube extending in this end.

Such a tubular connecting piece is very suitable for connecting this connecting piece with a helically grooved tube by cutting out an opening, adapted to the diameter of the tube to be connected, in the wall portion, since the edge of the wall portion surrounding the opening acts already as screw thread when the tube to be connected is screwed in.

Preferably at least one of the ends of the tubular connecting piece is at least partially closed by an end wall portion consisting of end planes making an angle with respect to one another and each covering at least a part of half of the section of the end, the faces of closure being connected with planes extending substantially in a direction parallel to the longitudinal direction of the end of the tubular piece.

On cutting out a desired opening in the wall portion a pitch is obtained for screwing in the helically grooved tube to be connected.

The above objects are met by providing a device for engagement with a cylindrical member having exterior helical grooves, the device comprising a tubular connector having at least one tubular end portion having a tubular peripheral wall defining an opening means therein, the end portion also having deformable end wall means fixedly secured to the tubular peripheral wall adjacent one axial end thereof and at least partially closing the opening means. The end wall includes a first substantially planar wall portion extending across a first portion of the opening means at an acute angle relative to the longitudinal axis of the tubular end portion, and also includes a second substantially planar wall portion extending across a second portion of the opening means at an acute angle to said longitudinal axis and to the first wall portion. The end wall means has an opening formed therein to receive the exteriorly grooved part of the cylindrical member, the angular relationship between the first and second wall portions being compatable with the pitch of the helical groove and the thickness of the wall portions being less than the pitch of the helical groove to permit the connector and the cylindrical member to be threadably connected.

The invention will now be clarified with reference to the drawing in which an embodiment is clarified.

In the drawing:

FIG. 1A is a perspective view of a three-way tubular connecting piece according to the invention in which the opening is provided;

FIG. 1B is a side elevation of a tubular connecting piece according to FIG. 1A;

FIG. 2A is a three-way tubular connecting piece with an end wall portion comprising two planes making an angle with respect to one another;

FIG. 2B is a side elevation of a tubular connecting piece according to FIG. 2A.

Represented in FIGS. 1A and 1B is a three-way tubular connecting piece 1 comprising three tube portions 2, 3 and 4. The end 5 of the tube portion 4 is closed by a planar end wall portion 6 which extends at an acute angle with respect to the longitudinal axis 7 of this tube portion 4.

By cutting out an opening 8 in this end wall portion 6, the edge 9 constitutes the desired thread of a screw for permitting a helically grooved tube to be screwed into the opening.

In the same way the ends 10 and 11 of the tube portions 2 and 3 are provided with end wall portions (not shown) similar to the end wall portion 6.

Another embodiment consisting of a three-way tubular connecting piece 1 with tube portions 2, 3 and 4 is represented in FIGS. 2A and 2B. The end 5 of this tube portion 4 is now closed by two planes 12 and 13 which each cover about half the section of this tube portion, each of the planes making an acute angle with respect to the longitudinal axis 7 of the tube portion 4. These angles $\alpha$ and $\beta$ are preferably equal.

The planes 12 and 13 are interconnected by connecting planes 14 and 15 extending in the longitudinal direction of the tube portion 4. Portions are cut out from the faces 12 and 13 while forming an opening bounded by the edges 17, 18, 19 and 20.

Into the thread formed in this way a tube with a double thread can be easily screwed.

The tubular connecting pieces 1 may consist of any suitable material such as metals but preferably of plastic, like thermoplastics, for example, polyethylene or polyvinyl chloride or reinforced thermocurable resin.

Having thus described the invention and manner of its operation what I claim as my invention is:

1. In a device for engagement with a cylindrical member having exterior helical grooves, a tubular connector having at least one tubular end portion having a tubular peripheral wall defining an opening means therein, said end portion also having deformable end wall means fixedly secured to said tubular peripheral wall adjacent one axial end thereof and at least partially closing said opening means, said end wall including a first substantially planar wall portion extending across a first portion of said opening means at an acute angle relative to the longitudinal axis of said tubular end portion, and including a second substantially planar wall portion extending across a second portion of said opening means at an acute angle to said longitudinal axis and to said first wall portion, said end wall means having an opening formed therein to receive the exteriorly grooved part of said cylindrical member, the angular relationship between said first and second wall portions being compatible with the pitch of the helical groove and the thickness of said wall portions being less than the pitch of said helical groove.

2. A connector according to claim 1, wherein said planar wall portions are inclined relative to one another for permitting said connecting piece to be screwed onto a tube having a plurality of external helical grooves thereon.

3. A connector according to claim 1, wherein said connecting piece is constructed of plastic.

4. A connector according to claim 1, wherein said connector includes a second tubular end portion substantially identical to said first tubular end portion.

* * * * *